(12) United States Patent
Kapoor et al.

(10) Patent No.: US 7,921,189 B2
(45) Date of Patent: Apr. 5, 2011

(54) SINGLE VIRTUAL CLIENT FOR MULTIPLE CLIENT ACCESS AND EQUIVALENCY

(75) Inventors: Rahul Kapoor, Bellevue, WA (US); Rolando Jimenez Salgado, Redmond, WA (US); Satish Thatte, Redmond, WA (US); Yi Mao, Redmond, WA (US); Ricard Roma I Dalfó, Redmond, WA (US); Anuj Bansal, Redmond, WA (US); Saji Varkey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 922 days.

(21) Appl. No.: 11/602,085

(22) Filed: Nov. 20, 2006

(65) Prior Publication Data

US 2008/0120362 A1 May 22, 2008

(51) Int. Cl.
*G06F 15/177* (2006.01)
(52) U.S. Cl. .. 709/220; 709/203; 709/223; 707/999.001
(58) Field of Classification Search ................. 709/203, 709/220, 223
See application file for complete search history.

(56) References Cited

U.S. PATENT DOCUMENTS

| | | | |
|---|---|---|---|
| 5,701,480 | A | 12/1997 | Raz |
| 6,012,094 | A | 1/2000 | Leymann et al. |
| 6,216,126 | B1 | 4/2001 | Ronstrom |
| 6,266,666 | B1 | 7/2001 | Ireland et al. |
| 6,879,997 | B1 | 4/2005 | Ketola et al. |
| 6,892,210 | B1 | 5/2005 | Erickson et al. |
| 6,973,657 | B1 | 12/2005 | Ahmad et al. |
| 6,983,293 | B2 | 1/2006 | Wang |
| 7,080,158 | B1 | 7/2006 | Squire |
| 7,089,253 | B2 | 8/2006 | Hinshaw et al. |
| 7,103,597 | B2 | 9/2006 | McGoveran |
| 7,240,826 | B2 | 7/2007 | Abecassis et al. |
| 2002/0133508 | A1 | 9/2002 | LaRue et al. |
| 2003/0131045 | A1 | 7/2003 | McGee et al. |
| 2004/0111698 | A1 | 6/2004 | Soong et al. |
| 2004/0172423 | A1 | 9/2004 | Kaasten et al. |
| 2005/0050142 | A1 | 3/2005 | Capone et al. |
| 2005/0149481 | A1* | 7/2005 | Hesselink et al. ............ 707/1 |
| 2005/0149601 | A1 | 7/2005 | Cox et al. |
| 2005/0198132 | A1 | 9/2005 | Vellante et al. |
| 2005/0210152 | A1 | 9/2005 | Hawes |

(Continued)

OTHER PUBLICATIONS

An Agent-Based Approach for Universal Personal Computing, M.H. W.U Kumara; Pilian He and Xuejun Sun, Schhol of Electronic Information Engineering, Tianjin University, Tianjin, 300072, China, Dec. 4-12, 2000 (pp. 18-21).*

(Continued)

*Primary Examiner* — Yves Dalencourt

(57) ABSTRACT

A single virtual image of client information centrally located at an always-on network location for maintaining equivalency among multiple user devices. The image can be accessed by the user devices when coming online to upload and receive changes in the client information. A mid-tier system can be employed as the always-on central location with which the user client machines can communicate to maintain the same set of client information. Services in support thereof include an ownership service for dynamic selection of a designated client machine to take ownership for performing the actions on one client machine and arbitration of duplicate requests, a notification service for allowing data sources to publish cache update instructions to a central place, a roaming service for allowing clients machines to share state with each other, and an encryption service for secure storage and communications of client information.

20 Claims, 16 Drawing Sheets

U.S. PATENT DOCUMENTS

2006/0069809 A1 3/2006 Serlet
2006/0136441 A1 6/2006 Fujisaki
2007/0072605 A1* 3/2007 Poczo .................. 455/432.2

OTHER PUBLICATIONS

"Peer High performance file synchronization and replication software", Date: 2004, http://www.peersoftware.com/solutions/peersync/product_pdf/ps71overview.pdf.

Boukerche, et al., "A Hybrid Solution to Support Multiuser 3D Virtual Simulation Environments in Peer-to-Peer Networks", Distributed Simulation and Real-Time Applications, 2004, DS-RT2004. Eighth IEEE International Symposium, Date:Date.

Kanhere, et al., "Service-oriented middleware for peer-to-peer computing", Industrial Informatics, 2005. INDIN '05. 2005 3rd IEEE International Conference, Date: Aug. 10-12, 2005, On pp. 98-103, http://ieeexplore.ieee.org/search/srchabstract.jsp?.

Liebig et al., "Middleware Mediated Transactions", Proceedings of the Third International Symposium on Distributed Objects and Applications, Sep. 17-20, 2001.

Manassiev et al., "Exploiting Distributed Version Concurrency in a Transactional Memory Cluster" Proceedings of the eleventh ACM SIGPLAN symposium on Principles and practice of parallel programming, Mar. 29-31, 2006.

Cavazos et al., "A 3-Tiered Client-Server Distributed Database System Component-Based", Proceedings of the winter international synposium on Information and communication technologies, Jan. 5-8, 2004.

* cited by examiner

SINGLE VIRTUAL CLIENT FOR MULTIPLE CLIENT ACCESS AND EQUIVALENCY

BACKGROUND

Users can have multiple computing devices with which to interact with data and programs in both online and offline modes. For example, it is commonplace to have a desktop computer, and one or more additional computing devices such as a portable computer and a mobile device (e.g., cell phone) with which to access network services. A problem, however, is that maintaining an equivalent set of client information on all the user devices becomes problematic. For example, a user may conduct initial activity via a desktop computer and then leave on a business trip with a laptop computer that lacks the desired updated information and settings generated on the desktop computer. Moreover, even if the user connects at a later time from a different location, in most cases, the information interacted with on the desktop computer remains unobtainable.

Similarly, while on the business trip, if the user performs data operations offline or online using the portable computer, these operations may not be propagated to the user's desktop computer. Thus, should the user want the same information on another user computing device, typically, the user is left to utilize some rudimentary technique (e.g., manually) to transfer data and settings to the desired device, a time consuming and inefficient expenditure of user resources.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject innovation addresses client information equivalency among multiple computing devices of a single user by generating and maintaining a single virtual client image of client information at an always-on network location accessible by the multiple user devices. In one implementation, a mid-tier system is employed as the always-on central location with which the user's client machines or the back-end data sources can communicate. In another implementation, a back-end system is employed as the central location for maintaining the client image and providing the services in support thereof.

Services can include an ownership (also referred to as arbitration) service for arbitrating between identical client requests and dynamically selecting a client machine to take ownership for performing the update actions to the image for one client machine, a notification service for allowing data sources to publish cache update instructions to a central place and from which the instructions can be staged, a roaming service for allowing clients machines to share state with each other while avoiding the complexities of a peer-to-peer replication topology, and an encryption service for secure storage and communications of client information.

The client machines can perform CRUDQ (create, read, update, delete, and query) operations on the data sources and propagate the results of these operations to processes hosted on the clients (e.g., an e-mail program or word processing program) through a process referred to as cross synchronization. The innovation addresses duplicate request problems associated with processes of a synchronization circuit (e.g., an e-mail program and e-mail server) that propagate the results of cross synchronization to all client machines which are part of that circuit. The selection of a designated machine via the ownership services avoids duplicate requests and potential conflicts created as a result of the separate synchronization circuits.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
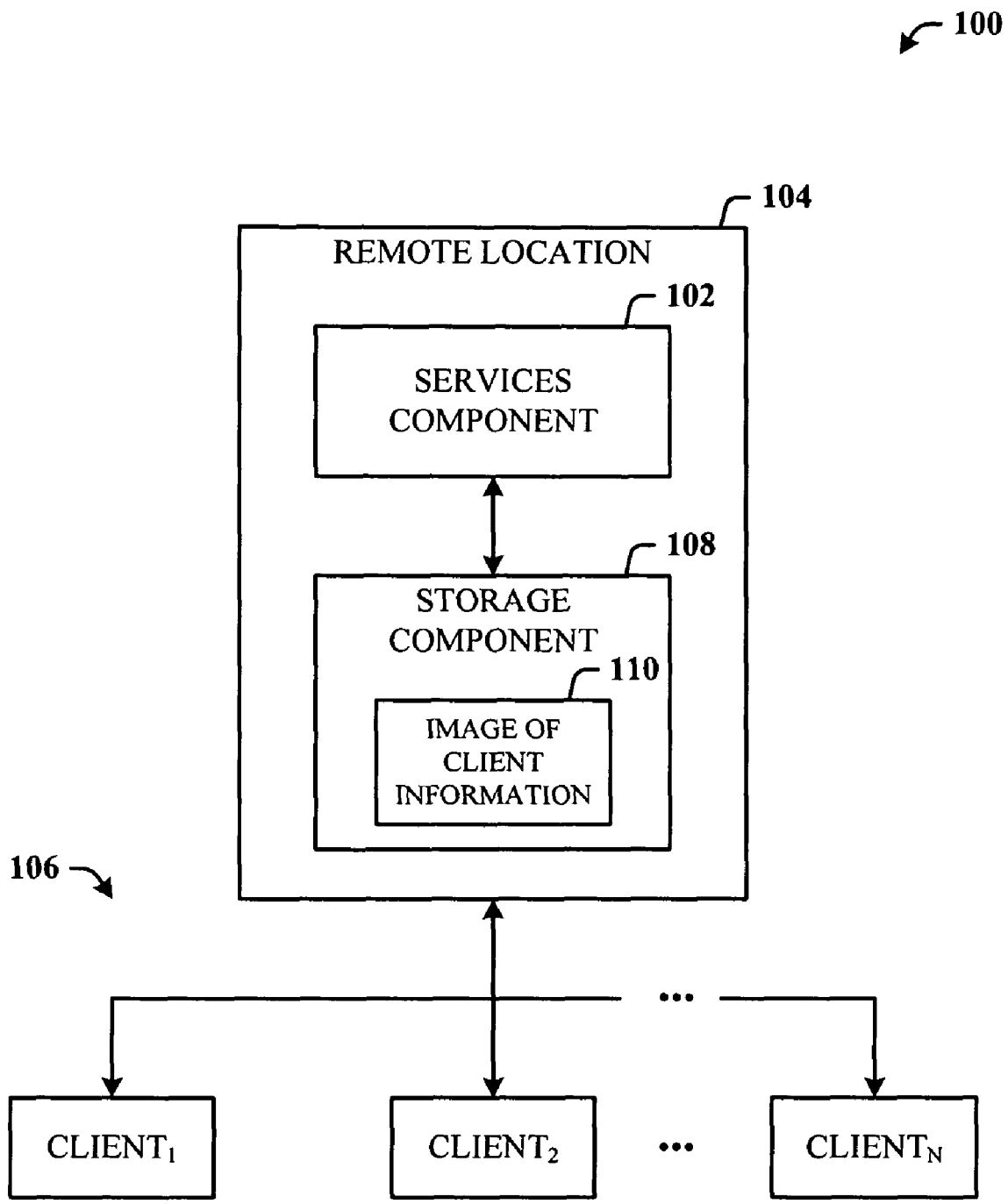
FIG. 1 illustrates a system that facilitates client management in accordance with a single virtual client image of the disclosed innovation.

Disclosed herein is novel architecture for addressing conventional data update and synchronization problems between multiple computing devices (e.g., desktop computer, portable computer, cellular phone and PDAs) of a single user. The innovation creates a single virtual client image of client information (e.g., data, data operations, device settings, program settings, and profiles) from the multiple user devices and maintains (e.g., creates and updates) the image at a central always-on network location (e.g., a mid-tier system) that is accessible by the user devices.

The network (or remote) location hosts a set of services in support of, for example, coordinating image creation and maintenance, client device selection, secure communications, error handling, and propagation of an updated image to the client(s) that need the update, once online. For example, an ownership service provides for the dynamic selection of a designated client device which takes ownership for performing the actions on one client machine. The selection of a designated machine facilitates arbitration by avoiding duplicate requests and potential conflicts created as a result of the separate synchronization circuits. One example of a conventional cross synchronization circuit is an e-mail server that provides e-mail client update services to a large number of client devices. A change in one client gets propagated through the server to other selected clients as part of the cross synchronization process.

As described herein, the client devices can perform create, read, update, delete, query (CRUDQ) operations, for example, on the data sources (local and/or remote) and propagate the results of these operations (as part of client information) to other clients through the network location. In other words, the network location (e.g., a mid-tier system) functions as a router, by routing client information between the various client devices the user may have in order to keep the client machines suitably updated (and equivalent) at substantially all times.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Referring initially to the drawings, FIG. 1 illustrates a system 100 that facilitates client management in accordance with a single virtual client image of the disclosed innovation. The system 100 includes a services component 102 of a remote location 104 for providing coordination services for coordination of client information across multiple clients 106 of a user. A storage component 108 (e.g., persisted datastore, caching system) is provided at the remote location 104 for maintaining an image 110 of the client information for access by the multiple clients 106. The image 110 is editable in that as changes occur in one of the clients 106, these changes can be propagated to the remaining online clients and those offline clients that eventually come online. Thus, the user devices can store up-to-date client information associated with the work and/or user activities performed on the other clients.

In one implementation, the remote location 104 is a mid-tier system that provides always-on access and services in support of single client image maintenance. In another implementation, the remote location 104 is part of a back-end system remote from the mid-tier or intermediate system(s). In general, the remote system 104 can be a system with substantially always-on (also meaning always available) capability that provides the up-time for receiving client information, maintaining the client image, and propagating image information to the multiple clients 106 of the user devices (or machines).

The services component 102 hosts a number of services in support of centralized image maintenance and, client and data source management. For example, a notification service is provided for receiving cache update instructions from the multiple clients associated with cached client information, and from data sources (not shown) seeking information from the clients 106. An ownership service is provided for selection of one of the multiple clients 106 to perform synchronization actions with the image. An encryption service is provided for generating and tracking an encryption key provided to the multiple clients 106 for encrypting client data and providing other secure services.

The services component 102 also provides a roaming service for sharing client state among the multiple clients 106. More specifically, the roaming service propagates mapping of a temporary correlation identification (ID) to an entity ID (EID) on all machines, thereby enabling look-up of the mapping information on any given machine.

In general, the system includes a centralized always-on network location for hosting services for client machines and data sources. The services include, but are not limited to, notification, ownership (which provides arbitration), encryption, and roaming. The location can be a mid-tier system and/or a back-end system that functions as a central router/publisher to share information between multiple client machines (or devices).

Figure 2:
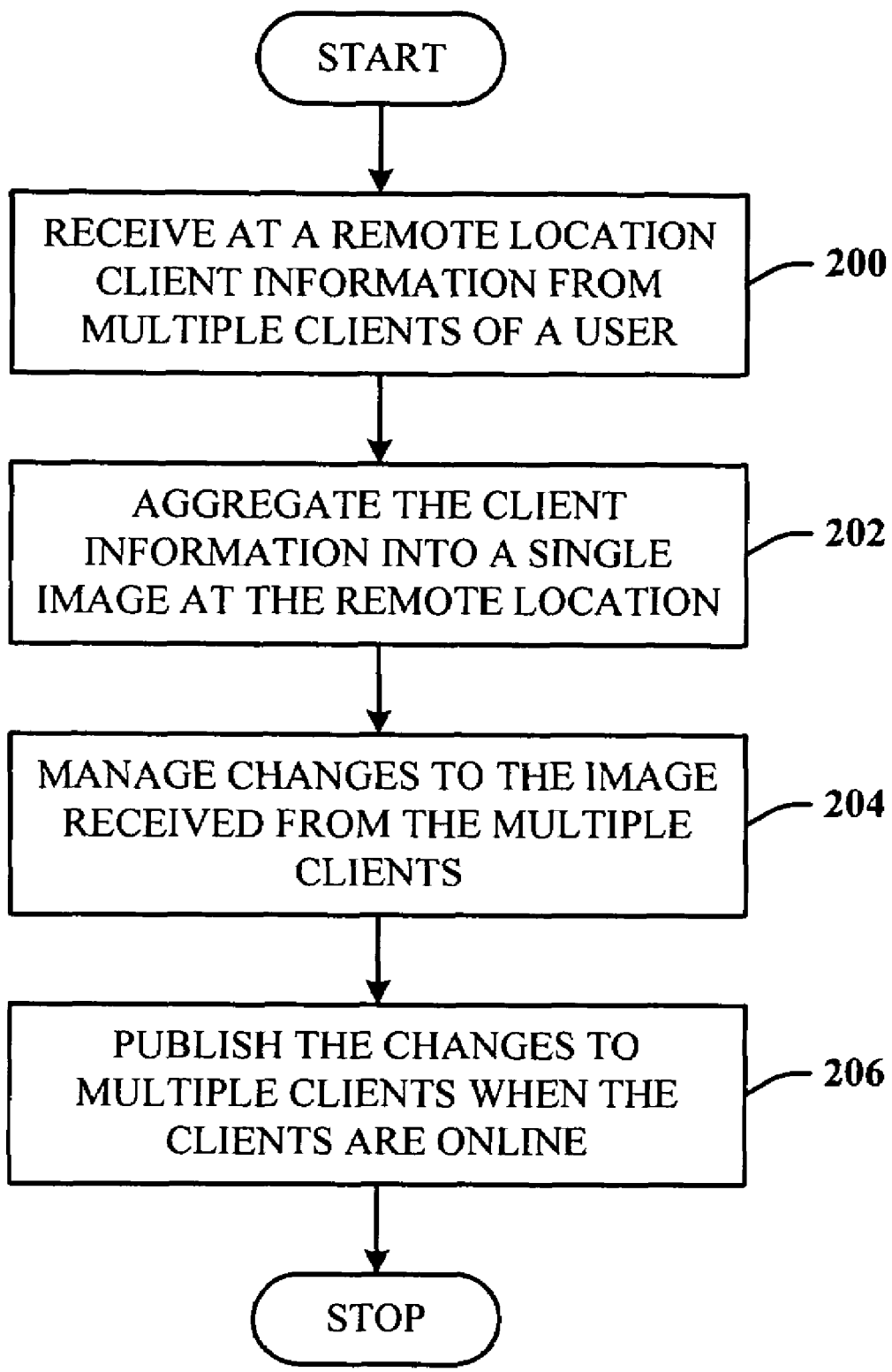
FIG. 2 illustrates a methodology of managing client information using a centrally located single client image.

FIG. 2 illustrates a methodology of managing client information using a centrally located single client image. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, client information is received at a remote location (e.g., mid-tier system) from multiple client devices. In one implementation, the client information is received one client at a time. At 202, the received client information is aggregated at the remote location as a client information image that can be changed and updated as necessary to reflect changing client information in the client devices of the user. At 204, changes to the image are managed at the remote location based on the client information received from the client devices. At 206, the changes to the image are published to the clients when the clients are accessible (or online).

Figure 3:
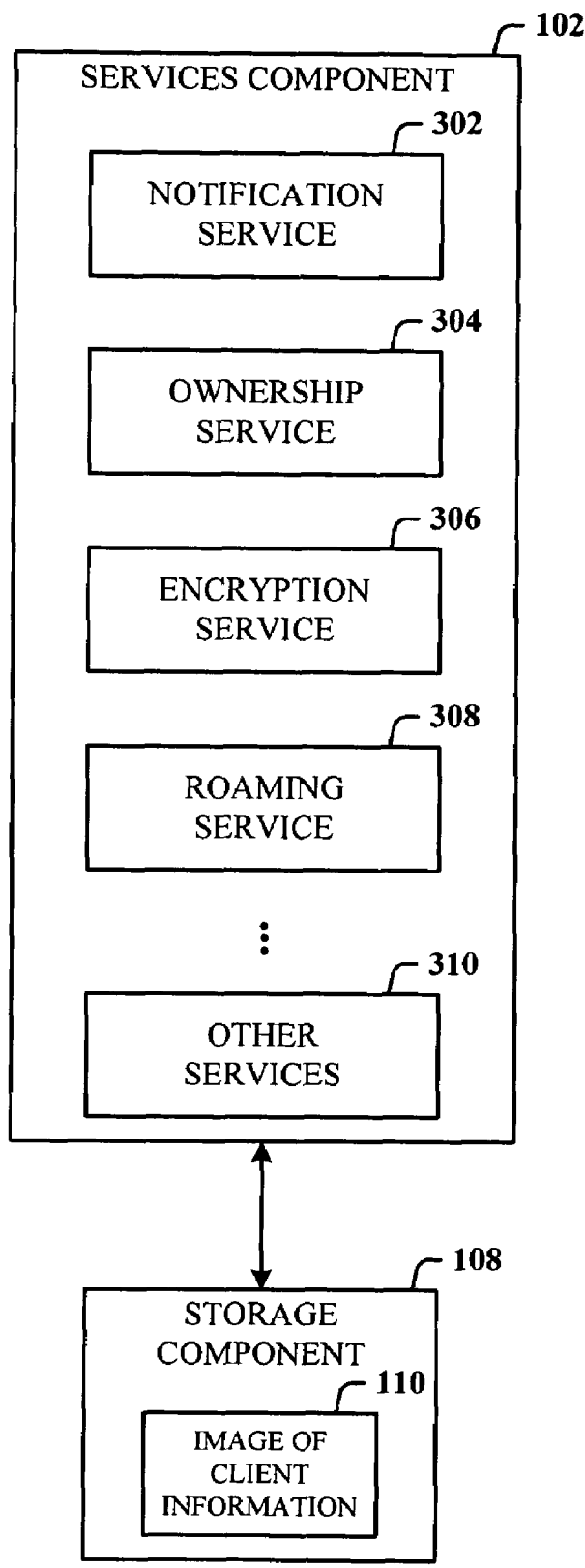
FIG. 3 illustrates a diagram of services that can be provided by the services component for image maintenance.

Referring now to FIG. 3, there is illustrated a diagram of services that can be provided by the services component 102 for image maintenance. A notification service 302 allows for data sources to publish cache update instructions to the remote location (or central system).

An ownership service 304 allows for the dynamic selection of a client machine to perform actions, for example, communicate changes to the central system. In other words, the ownership service 304 facilitates the selection of one client machine as the one designated to perform cross synchronization actions, ID fix-up, or error fix-up.

An encryption service 306 at the service remote location allows for encrypting sensitive data on each of the client machines of the user. A key is generated and used for encryption centrally and is available on each of the client machines. The encryption service generates and tracks a key per user, and thus, every client machine of the user has access to the key. The key can be cached locally on the client machines and the cached image can be protected by a client machine specific key.

User-sensitive data can be stored in the client system in a client datastore (CDS). This data can be protected from access by other users including system administrators. One of the common scenarios where this feature is beneficial is a lost/stolen laptop scenario. If a laptop with the CDS is lost, the user-sensitive data can be protected from unauthorized access (including the local system administrator who may have access to the laptop). Encryption is transparent to the user wherein the user does not have to manually enter or manage any keys. Additionally, there is a backup mechanism for re-creating the key in case the key is lost from a client machine. This scheme stores the encryption key in the central system (e.g., mid-tier). The encryption key can encrypt data in the CDS using, for example, a symmetric algorithm such as AES (advanced encryption standard). When the CDS is deployed on a client machine, the encryption key can be retrieved from the central system. A central system encryption key web service can be provided to retrieve the key.

The key in the central system can be stored as binary data along with the associated user ID. When an encryption key is requested, the central system checks its encryption key table for the existence of a key for the caller user ID. If the key is present, it is returned; otherwise, a new key is created. Once the encryption key is retrieved from the central system, the CDS stores the encryption key in the local database after encrypting it using, for example, DPAPI (data protection application programming interface).

Encrypting the key using DPAPI in user mode on the client machine ensures that no one other than the user will be able to access the key, and hence, decrypt the data (including the local system administrator). In addition, by using encryption, user password changes will not affect key decryption. Using the key from the central system, the user can easily decrypt data from one client machine on a different client machine. Since the key is stored on the central system, the key can also be later retrieved by the user from the central system as a means of backup.

Another implementation generates a seed that is stored in a central system database. In this scheme, the central system supplies a seed for the encryption key rather than the key itself The client machines generate the key from the seed via user specific information. Keys generated on two machines with the same seed for the same user will be the same. Since the central system does not store the key, the central system administrator does not have direct access to the encryption key.

In yet another implementation, the key is password-protected and stored in the central system database. In this scheme, the encryption key is created on the first client machine when the client cannot get a stored key from the central system. The new key is password protected (e.g., using the user's login password or a key derived from the password) and stored on the central system. On the client machine, password changes can be monitored. When the password changes, the central system key is updated after encrypting the original key (stored locally and protected with DPAPI) with the new password. Once the CDS retrieves the key, it can be stored in the local database after encryption with DPAPI. Since the key stored on the central system is encrypted, the system administrator will not have access to the key.

In still another implementation, the CDS database files are encrypted with an operating system encrypting file system. Here, the CDS does not need to manage the keys since the encryption is done by the operating system. Such encrypted files can be configured to deny access to local administrators.

Other encryption alternatives include full data encryption (e.g., in varbinary), partial data encryption (in XML-extensible markup language), and data encryption with promoted properties. In the XML approach, data is stored in XML and only the data that is marked for encryption will be encrypted in XML. Unencrypted data can be queried using XQuery.

A roaming service 308 allows clients machines to share state with each other while avoiding the complexities of a peer-to-peer replication topology. Information roamed can include ID mapping tables, business error information, cache update instructions, encryption key, and ownership information. Other services 310 can also be provided as desired such as for mid-tier operations when the services component 102 is operated from a mid-tier system or a back-end location where on a back-end server.

The storage component 108 can be located at the same location as the services component 102 or at a location remote therefrom. For example, in a distribute database system, it is to be understood that the storage component 108 can include cached and/or persisted data that spans several locations, and the client information image can also be distributed accordingly.

Figure 4:
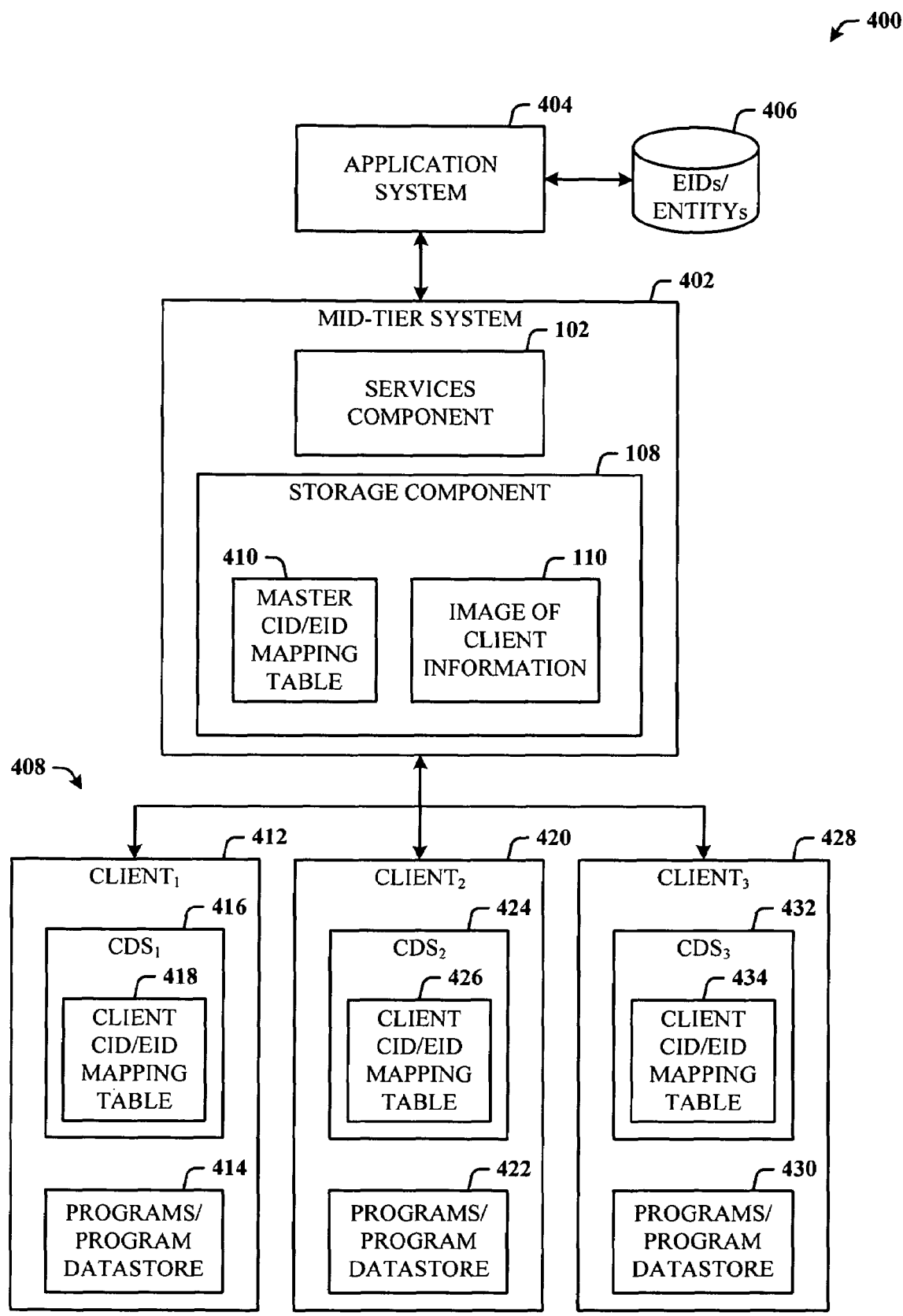
FIG. 4 illustrates a system that employs identity mapping tables to track offline client activities that are desired to be propagated to other user clients via the client information image.

FIG. 4 illustrates a system 400 that employs identity mapping tables to track offline client activities that are desired to be propagated to other user clients via the client information image. In this particular implementation, the services component 102 and storage component 108 are part of a mid-tier system 402 that interfaces to an application system 404 associated with a data source 406 for storage and access of application system data. The application system 404 and data source 406 provide an entity/EID table that uniquely identifies data, and which when accessed the EID follows the data. Thus, updates to the data of the data source 406 are tracked and managed using the EIDs. This is described in greater detail infra.

In one implementation, the application system 402 can include a back-end server system that serves up back-end services for an enterprise, for example, and which the data source 406 provides enterprise data storage. Note that the data source 406 can be a cache system rather than a persisted data system, or a combination of persisted and cached subsystems for data handling suitable for the particular implementation.

In an alternative implementation, the application system 404 can include a line-of-business (LOB) application system for addressing business applications (e.g., human resources, sales and operations, customer relations, financials, and product design) of a company and the data source 406 stores and/or persists LOB data for access.

With the ubiquity of computing devices available to users, a user can utilize different client devices 408 to access and effect data operations and/or application functionality, thereby potentially causing each of the user devices to store different versions of data, for example, and/or application/system settings (also included as part of the client information), and so on. In other words, the client systems 408 can include programs that facilitate user access to the applications of the application system 404 and/or data of data source 406 via the mid-tier system 402, download the data to a user client, operate on the data, and then upload the changed data back to the data source 406.

However, a problem can arise in data synchronization when the client goes offline, and changes are made to a client data entity that should be tracked and eventually reconciled to the central image for synchronization to the other client systems 408. This problem is solved herein by using temporary correlation IDs (CIDs). A temporary CID allows the correlation of data operations on the same entity until the real entity ID (EID) is available by the client moving to an online state and communicating with the data source (e.g., data source 406). A temporary CID maps to only one machine of the client devices 408, and further, to only one entity instance on the machine. In other words, one offline machine can have ongoing data operations on multiple entity instances where each entity instance is assigned a different unique temporary CID for eventual mapping to the EID and relating of the corresponding data operations performed on the entity instance.

As before, the storage component 108 maintains the image 110 of the client information. Additionally, in support of resolving at least the offline client scenario, the storage component 108 includes a master identity table 410 that maps CIDs to EIDs. The mid-tier system 402 is used as an always-on router (or a read-only publisher) that maintains the master table 410. The mapping of the CID to the EID is tracked until such time (e.g., the client device going online) the references to the CID can be replaced by the EID in the desired data source (e.g., data source 406).

The CID can also be embedded in objects hosted on clients such as an e-mail program or a word-processing application. Hence, the CID can reach a machine different from the original machine where the CID was created by virtue of the fact that these client processes have independent synchronization circuits.

Roaming services provide the CID to EID mapping on all machines to enable lookup (hence, fix-up) of the mapping on every machine, supporting the single virtual client image 110. Roaming is achieved by modeling a client machine as a subscriber that can update its owned rows in the master CID/EID table 410. Since one CID is unique to only one machine, only that machine can perform the insert/update of a given row in the master table 410 thereby preventing a conflicting update situation.

As illustrated, each of the clients 408 can include client application (or programs) and program datastores, a client datastore (CDS) and a client CID/EID mapping table. For example, a first client 412 (denoted CLIENT$_1$, and which, e.g., can be a desktop computing system) can include a programs and program datastore component 414 where the programs can associate data internally, rather than store the data independently on a first client datastore 416 (denoted CDS$_1$). The first client datastore 416 of first client 412 can be a cache storage system, a persisted storage system (e.g., a mass storage subsystem), or a suitable combination of both that supports maintenance of the single virtual image 110 of client information at the mid-tier system 402. A first client CID/EID mapping table 418 tracks offline operations using one or more of the CIDs for one or more corresponding entity data operations until the first client 412 goes back online and a synchronization process can occur to update the master table 410, the image 110, and potentially the data source 406. Note that this can also include updating the first client CDS 416 based on other data operations of the other clients.

Similarly, a second client 420 (denoted CLIENT$_2$, and which, e.g., can be a portable computing system) can include a programs and program datastore component 422 where the programs can associate data internally, rather than store the data independently on a second client datastore 424 (denoted CDS$_2$). The second client datastore 424 of second client 420 can be a cache storage system, a persisted storage system (e.g., a mass storage subsystem), or a suitable combination of both that supports maintenance of the single virtual image 110 of client information at the mid-tier system 402. A second client CID/EID mapping table 426 tracks offline operations using one or more of the CIDs for one or more corresponding entity data operations until the second client 420 goes back online and a synchronization process can occur to update the master table 410, the image 110, and potentially the data source 406. Note that this can also include updating the second client CDS 424 based on other data operations of the other clients.

Finally, a third client 428 (denoted CLIENT$_3$, and which, e.g., can be a cellular telephone device) can include a programs and program datastore component 430 where the programs can associate data internally, rather than store the data independently on a third client datastore 432 (denoted CDS$_3$). The third client datastore 432 of third client 428 can be a cache storage system, a persisted storage system (e.g., a mass storage subsystem), or a suitable combination of both that supports maintenance of the single virtual image 110 of client information at the mid-tier system 402. A third client CID/EID mapping table 434 tracks offline operations using one or more of the CIDs for one or more corresponding entity data operations until the third client 428 goes back online and a synchronization process can occur to update the master table 410, the image 110, and potentially the data source 406. Note that this can also include updating the third client CDS 432 based on other data operations of the other clients.

An encryption key is provided for encrypting data (e.g., sensitive) on each of the client machines 408. The key can be generated centrally by the mid-tier (or central) system 402, used for encryption centrally, and provided for each of the client machines 408. The encryption service 306 of FIG. 3 provides encryption at the mid-tier system 402 for generating and tracking a key per user. Accordingly, every client machine 408 of a single user has access to the key. The key can be cached locally on the client machines 408 and the cached image (in the cache of the CDS) can be protected by a machine-specific key.

Performing CRUDQ operations may lead to errors which are reported and tracked on the client machine that issues the operation. By roaming this error information using the mid-tier system 402 as an always-on router (or a read-only publisher) and the client machines 408 as subscribers which update the local client information, the visualization and possible fix-up of the errors can be enabled on the client machines 408, thereby further supporting the single virtual client image 110.

As indicated supra, an ownership service (service 304 of FIG. 3) of the mid-tier services component 102 facilitates enabling the dynamic selection of one of the client machines 408 as designated to perform cross synchronization actions, ID fix-up, and/or error fix-up, for example. The ownership service can be exposed as a web service with an interface that passes an "action" ID for ownership processing. Ownership can accept or process one or more of four parameters: an operation ID that indicates the type of data operation for which ownership is being requested (e.g., error fix-up); an item ID of the item or entity on which the data operation is being performed (e.g., EID); version/timestamp data for the version/timestamp associated with the item or entity on which the data operation is being performed; and, a client or machine ID, which uniquely identifies the machine or client for ownership. Ownership is granted to a machine/client for a given combination of Operation ID+Item ID+version/timestamp data. For example, the action ID can comprise an EID and view instance for cross synchronization actions, a machine name and operation ID for business error fix-up and/or the CID/EID fix-up.

If no other client machine has ownership, the requestor is granted ownership with a time limit to perform the action. The ownership assignment is dynamic, thus, preserving the equivalence of all client machines 408. The ownership information tracked at the mid-tier system 402 can be roamed and/or cached; that is, roamed to the client machines 408 to prevent redundant requests to the mid-tier system 402 (via arbitration, should the scenario occur) and/or created on demand (cached) when requesting ownership.

In one implementation, the ownership information can be used to detect if a client machine that took ownership has failed to process the action in a timely manner (e.g., due to an offline action such as shutdown, hardware failure, and purposeful disconnection). Alternatively, this can be accomplished manually. The algorithm can notify the user of this condition (e.g., a change not submitted because of stale ownership) and then let the user act on it. One exemplary act will be to update the item to a new version (e.g., a new timestamp) in which case a new ownership for the item can occur and the item can be submitted. Ownership is granted based on the operation ID+item ID+timestamp combination for a given machine or client ID. A different combination will grant a different ownership.

The client machines 408 cache view instance data in the respective client CDSs (416, 424 and 432) on direct usage of the data or based on a result of scheduled cache updates. However, the external data sources (e.g., data source 406) can choose to alert the client machines 408 and request updates using provided cache update instructions (e.g., add to cache, update cache, remove from cache). These requests can be staged in the mid-tier system 402 and use the roaming services to broadcast the cache update instructions to all client machines 408 of the user for whom the instructions were intended, thereby maintaining the single virtual client image 110. This can be achieved by modeling the client machines 408 as read-only subscribers with the mid-tier system 402 serving as the publisher. In one implementation, the publisher/subscriber behavior can be provided utilizing a SQL (structured query language) server merge/replication technology.

Figure 5:
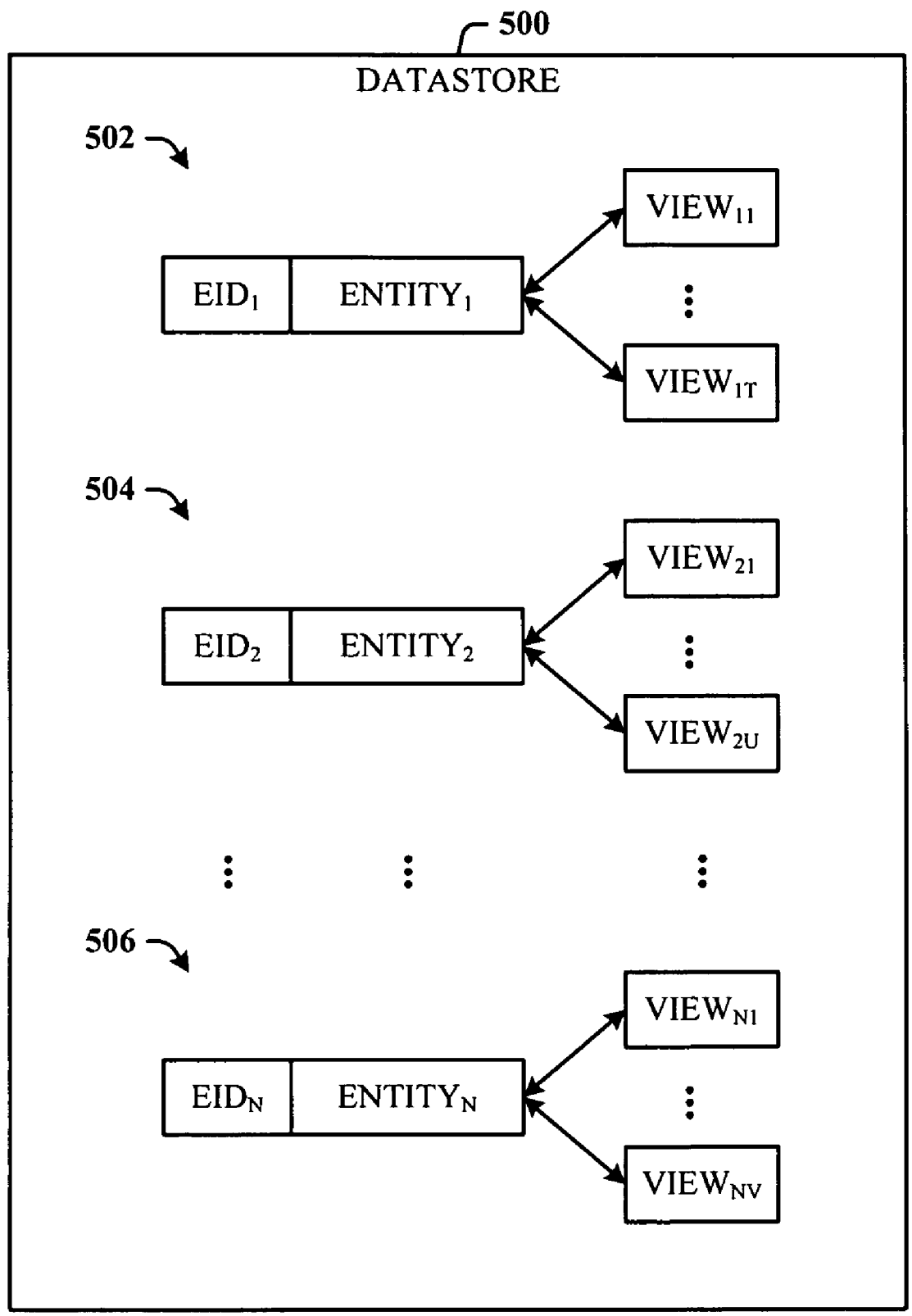
FIG. 5 illustrates an exemplary datastore with entities and views.

FIG. 5 illustrates an exemplary datastore 500 modeled with entities and views. As previously indicated, a datastore 500 (also referred to synonymously herein as a data source, e.g., data source 406 of FIG. 4) can be modeled as comprising a collection of entities, with each entity having multiple defined views (where a view is the lowest unit on which CRUDQ operations can be performed). Each entity has a unique identifier (an entity ID or EID) in the data source (e.g., data source 406).

Here, the datastore 500 includes a first entity set 502, which comprises a first entity (denoted $ENTITY_1$), one or more entity views (denoted $VIEW_{11}, \ldots, VIEW_{1T}$, where T is a positive integer) for this first entity, and a first entity ID (denoted $EID_1$) for identification of the first entity. Similarly, the datastore 500 includes a second entity set 504, which comprises a second entity (denoted $ENTITY_2$), one or more entity views (denoted $VIEW_{21}, \ldots, VIEW_{2U}$, where U is a positive integer) for this second entity, and a second entity ID (denoted $EID_2$) for identification of the second entity. As indicated, the model can include many different entities.

Thus, the datastore 500 includes an Nth entity set 506, which comprises a Nth entity (denoted $ENTITY_N$), one or more entity views (denoted $VIEW_{N1}, \ldots, VIEW_{NV}$) for this Nth entity, and an Nth entity ID (denoted $EID_N$) for identification of the Nth entity, where N and V are positive integers.

If the entity is created or changed offline in a client machine, then the EID may not be available to the remote data source (e.g., data source 406 of FIG. 4) to readily update the desired entity table thereof. Accordingly, the temporary CID is employed to relate the operations on the entity until the real data source system (e.g., data source 406) is accessible, and the real data source tables (of data source 406) can be updated.

Figure 6:
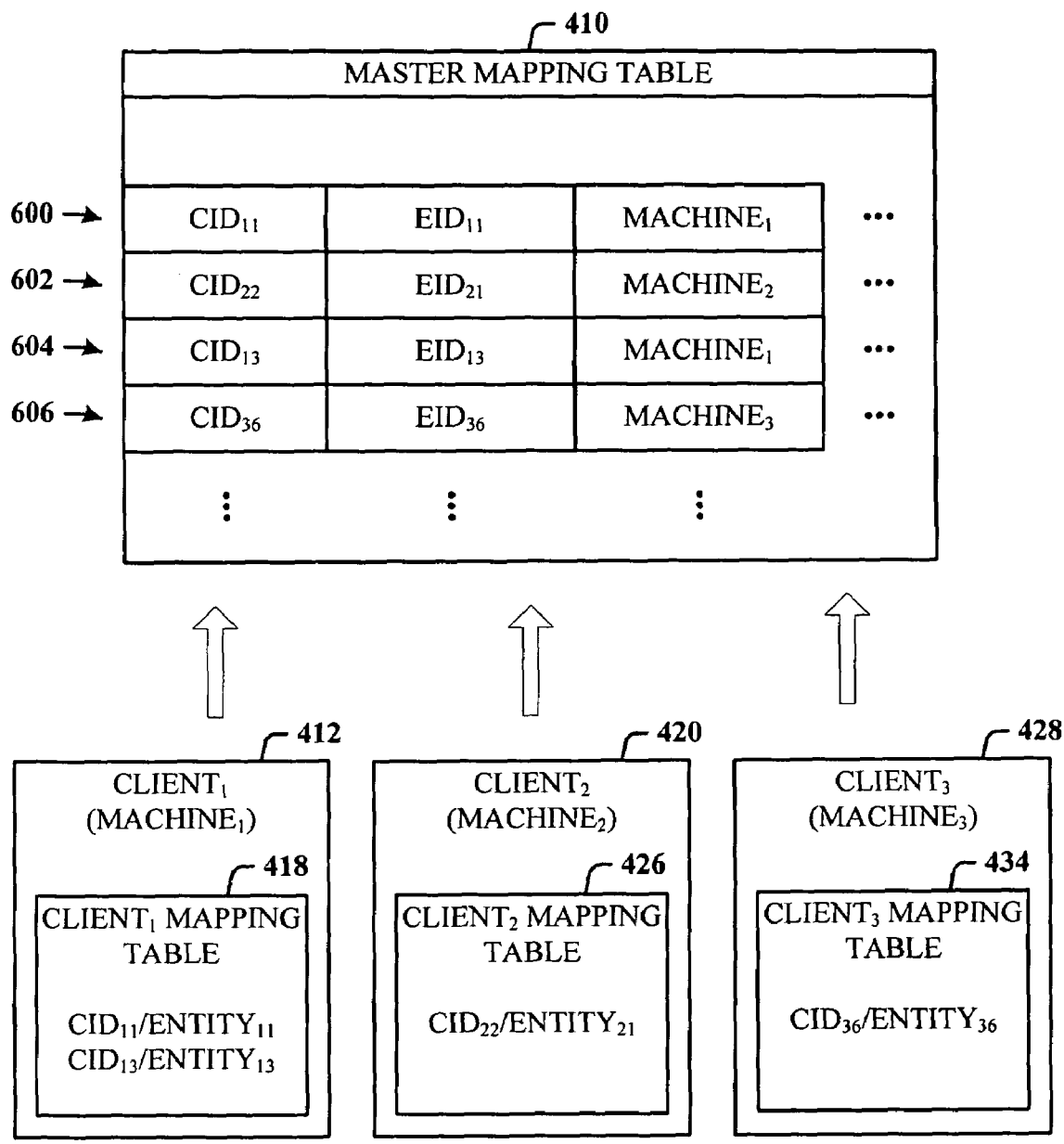
FIG. 6 illustrates exemplary mapping table relationships for master and client mapping tables.

FIG. 6 illustrates exemplary mapping table relationships for master and client mapping tables. As indicated supra, the master CID/EID mapping table 410 (of FIG. 4) can be maintained at the same always-on location (e.g., remote location, mid-tier system) as the client information image, although this is not a requirement. The master table 410 relates temporary CIDs to entity EIDs across one or more of the client machines. CIDs and EIDs are labeled as CIDxy and EIDxy, where x is a positive integer for the machine number and y is a positive integer for the entity instance that underwent the data operation. The first client mapping table 418 includes an offline data operation associated with an entity instance (denoted $ENTITY_{11}$) and corresponding temporary CID ($CID_{11}$). Accordingly, in this particular example, the master table 410 includes a first table entry 600 for the first client 412 that represents a relationship between a first master temporary CID (denoted $CID_{11}$) that correlates to a first entity instance having a first entity ID (denoted $EID_{11}$) associated with information being operated on (when the first client 412 is offline). The first table entry 600 can include additional client information such as the machine information (denoted $MACHINE_1$) that includes the client machine name, for example.

The second client mapping table 426 includes an offline data operation associated with an entity instance (denoted $ENTITY_{21}$) and corresponding temporary CID ($CID_{22}$). Accordingly, a second master table entry 602 for the second client 420 represents a relationship between a second temporary CID (denoted $CID_{22}$) that correlates to a second entity instance having a second entity ID (denoted $EID_{21}$) associated with information being operated on (when the second client 420 is offline). The second table entry 602 can include additional client information such as the machine information (denoted $MACHINE_2$) that includes the client machine name, for example.

The first client mapping table 418 also includes an offline data operation associated with an entity instance (denoted $ENTITY_{13}$) and corresponding temporary CID ($CID_{13}$). Accordingly, a third master table entry 604 for the first client 412 represents a relationship between the third temporary CID (denoted $CID_{13}$) that correlates to a third entity instance (or second entity instance of the first client 412) having a third entity ID (denoted $EID_{13}$) associated with information being operated on (when the first client 412 is offline). The third table entry 604 can also include the machine information (denoted $MACHINE_1$) of the first client machine 412.

The third client mapping table 434 includes an offline data operation associated with an entity instance (denoted $ENTITY_{36}$) and corresponding temporary CID ($CID_{36}$). Accordingly, a fourth master table entry 606 for the third client 428 represents a relationship between a fourth temporary CID (denoted $CID_{36}$) that correlates to a fourth entity instance (or first entity instance of the third client 428) having a fourth entity ID (denoted $EID_{36}$) associated with information being operated on (when the third client 428 is offline).

The fourth table entry 606 can include additional client information such as the machine information (denoted MACHINE$_3$) that includes the client machine name, for example.

As indicated previously, each machine is associated with unique temporary CIDs that are generated by the client during offline use. The CIDs relate data operations on client entity instances to the data source (e.g., data source 406 of FIG. 4) when the machine comes back online. Only the client machine assigned to the corresponding master table entry can update that table entry using the CID/EID mapping. More specifically, only the first client 412 is allowed access to the master table entries 600 and 604 associated with the first client CIDs (CID$_{11}$ and CID$_{13}$). Similarly, only the second client 420 is allowed access to the master table entry 602 associated with the second client CID (CID$_{22}$). Lastly, only the third client 428 is allowed access to the master table entry 606 associated with the third client CID (CID$_{36}$).

Figure 7:
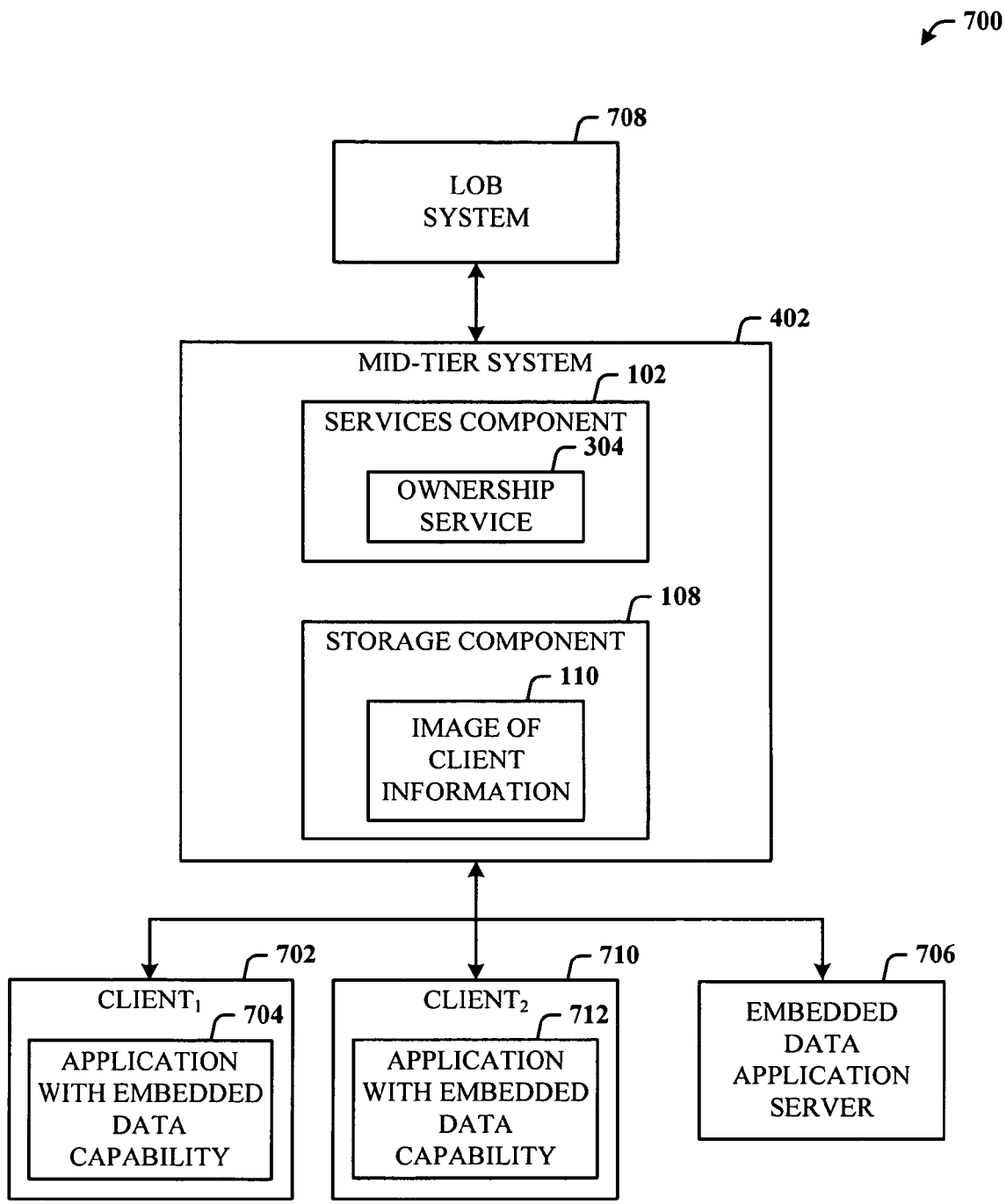
FIG. 7 illustrates a system that employs the ownership service for embedded application data handling in support of the single central image of client information.

FIG. 7 illustrates a system 700 that employs the ownership service 304 for embedded application data handling in support of the single central image 110 of client information. A complex problem can arise when data is embedded into another application in the client (e.g., via an e-mail program or word processing document) that itself has its own synchronization or roaming capabilities. For example, a first client 702 includes an application 704 with embedded data capability (e.g., an e-mail program) which can connect to a server 706 (e.g., an e-mail server) that supports the embedded data application 704 and provides the synchronization behavior of allowing the user to work from any machine with e-mail data without being concerned about the synchronization aspects of the information.

This embedded data capability is addressed by the disclosed architecture using the ownership service 304. The user can work with business data that is coming from an LOB system 708 (or back-end application), for example, in the same way that the e-mail program does, while also allowing the business data to be presented inside the e-mail program interface by embedding the business data inside the e-mail program items.

A side effect can be that since the data can be embedded inside the e-mail program items, the data that gets embedded can actually be passed to another user machine 710 and associated embedded data application 712 through the server 706. If managed incorrectly, the mid-tier system 402 can receive duplicate requests for actions that the user executed on one user machine (e.g., the first client 702). For example, consider contact information in an e-mail program that has been extended with business data for a customer. Then there exists the contact information in the e-mail program and the embedded customer data. The customer data is left in the e-mail program and e-mail server as well. The e-mail server (e.g., server 706) can make the customer data available to the application 712 of the second machine 710 for the same user.

If the user makes changes to the e-mail item and the customer data via one user machine (e.g., machine 702), the change will be automatically replicated by the e-mail server 706 to the other client machine 710 that runs the same e-mail program (e.g., application 712). The clients 702 and 710 will then try to push the changes to the LOB system 708. Thus, the LOB system 708 will receive two requests for the same change. The ownership service 304 of the services component 102 in the mid-tier system 402 arbitrates this duplicate request problem by allowing only one client (702 or 710) to make the changes to the LOB system 708. Accordingly, the disclosed architecture is capable of recognizing that only one of the clients (702 or 710) should be allowed to submit the change. It does not matter which client is selected, as long as only one client is allowed. The storage component 108 will then receive the intended changes for processing to the image 110 of client information. The same can occur in reverse. When the LOB information changes and it is required to change the original item (e.g., contact information in the email program that is related to a customer in the LOB system 708), in this case, ownership can be used to ensure that only one machine/client is allowed to propagate the changes from the LOB system 708 to the original item.

Figure 8:
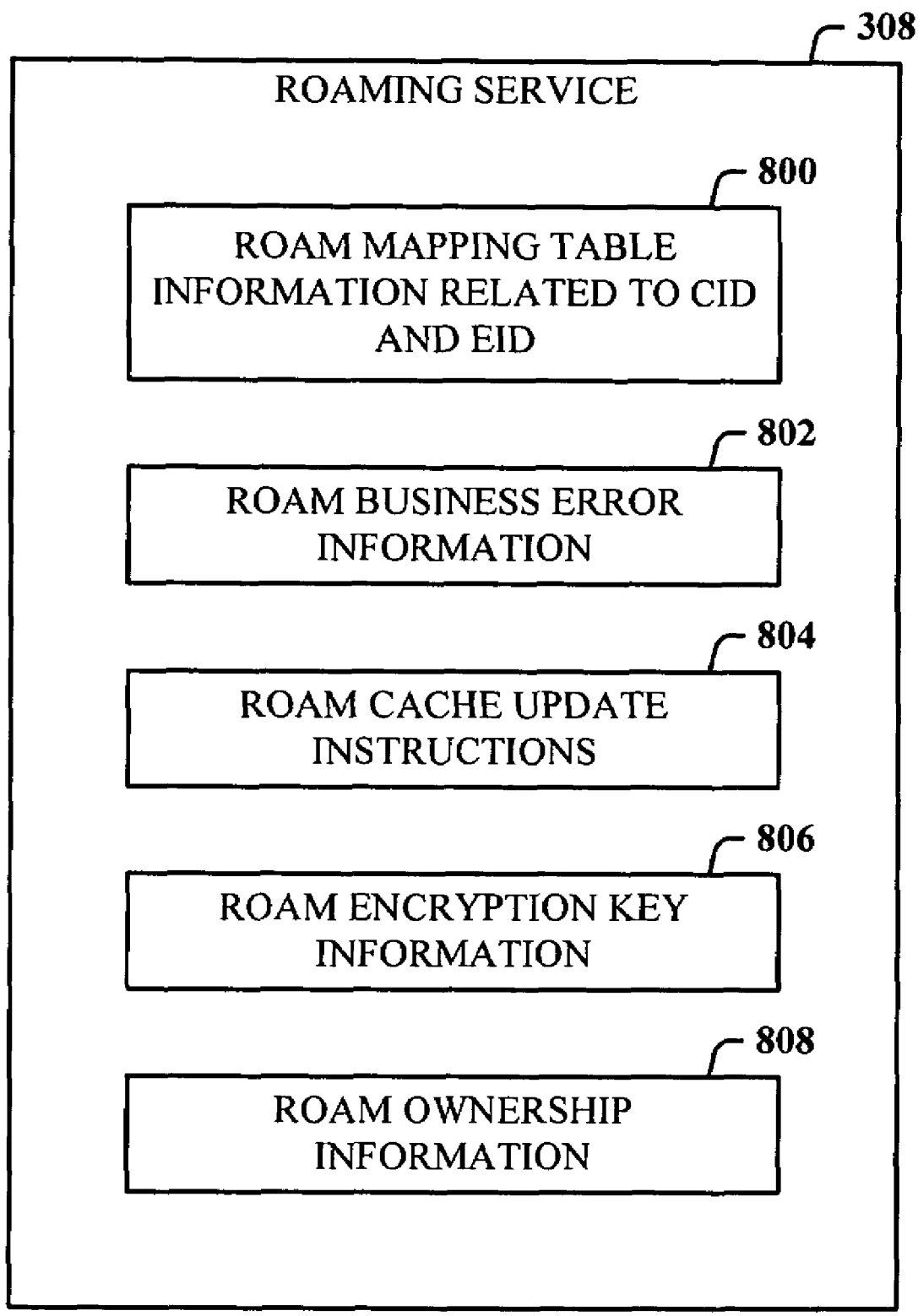
FIG. 8 illustrates a representation of information that can be roamed using the roaming service in accordance with maintaining a single virtual image of client information.

FIG. 8 illustrates a representation of information that can be roamed using the roaming service 308 in accordance with maintaining a single virtual image of client information. Roaming can be a continual process, a process that is initiated on a regular basis, and/or triggered in asynchronous manner, for example. Roaming is not a peer-to-peer operation, in that roaming operates through central (or mid-tier) location. The data involved in roaming can include pending application system (e.g., LOB) data, ID mapping tables and client-side-only data (e.g., drafts and application settings). In another implementation, roaming include only a queue-table, ID-mapping table, and fault (or error) tables. These tables do not conflict with each other when roaming among machines. The following information is roamed as parallel operations.

At 800, the mapping table information is roamed to track CID/EID mappings, enable client CID/EID mapping tables to access the mapping tables on other client machines, and eventually replace the CIDs with the corresponding EIDs. At 802, business error information is roamed to facilitate the reporting and tracking of errors on a client machine issuing the operation. At 804, cache update instructions are roamed. In other words, these instructions can be staged at the central location (e.g., the mid-tier system) and published to the intended clients in support of maintaining the single client image. At 806, encryption key information is roamed. In other words, a key is generated centrally for each user (or set of user machines) for encryption of client information on the clients. At 808, ownership information is roamed that facilitates dynamic selection of one of the client machines for cross synchronization processing, ID fix-up, and error fix-up, for example.

Figure 9:
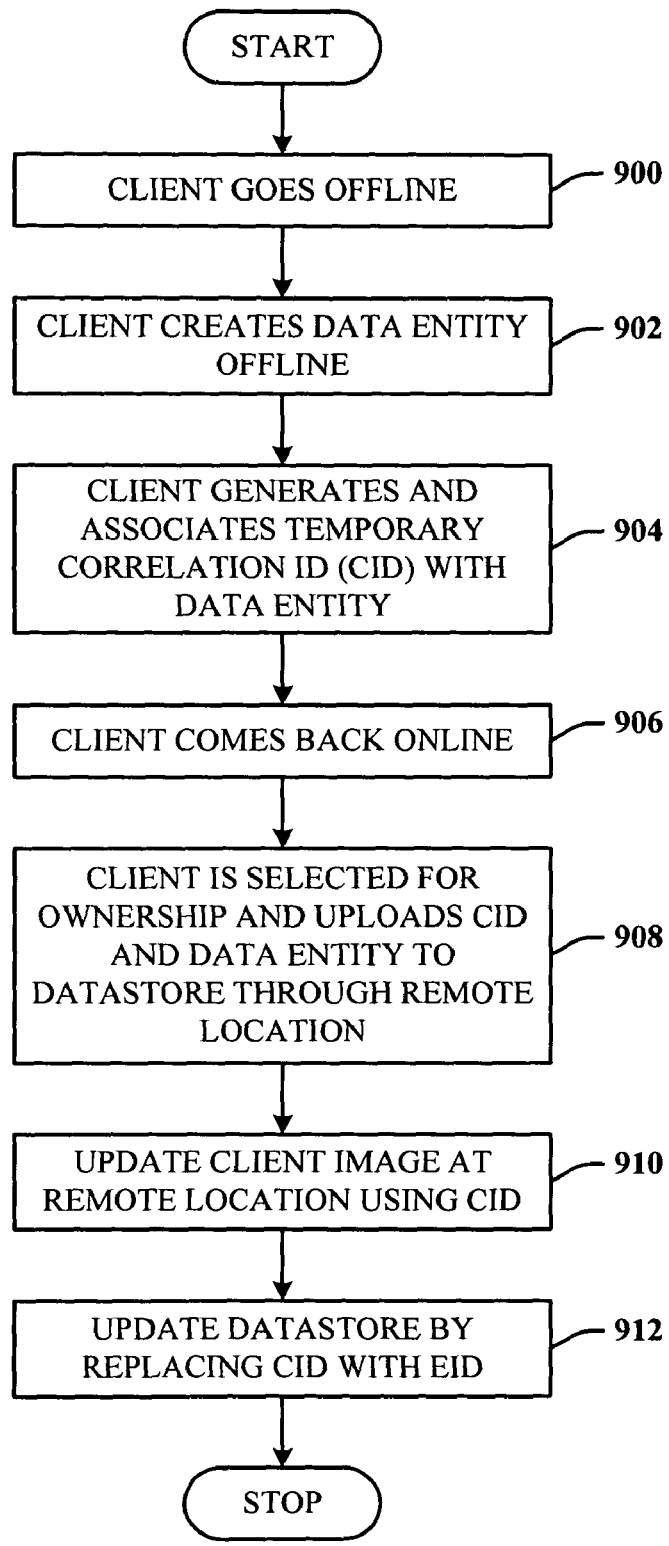
FIG. 9 illustrates a methodology of tracking offline client data entity activity.

FIG. 9 illustrates a methodology of tracking offline client data entity activity. At 900, the client goes offline. At 902, the client creates data (a data entity) while offline. At 904, the client generates and associates a temporary CID with the data entity. At 906, the client comes back online. At 908, the client is selected for ownership and uploads the temporary CID and data entity to the datastore through the remote location. At 910, the client image at the remote location is updated using the CID. At 912, the datastore is updated by replacing the CID with an EID. This also facilitates updating the client tables with the correct replacement EIDs when each of the clients are selected for synchronization to other client information from the central image.

Figure 10:
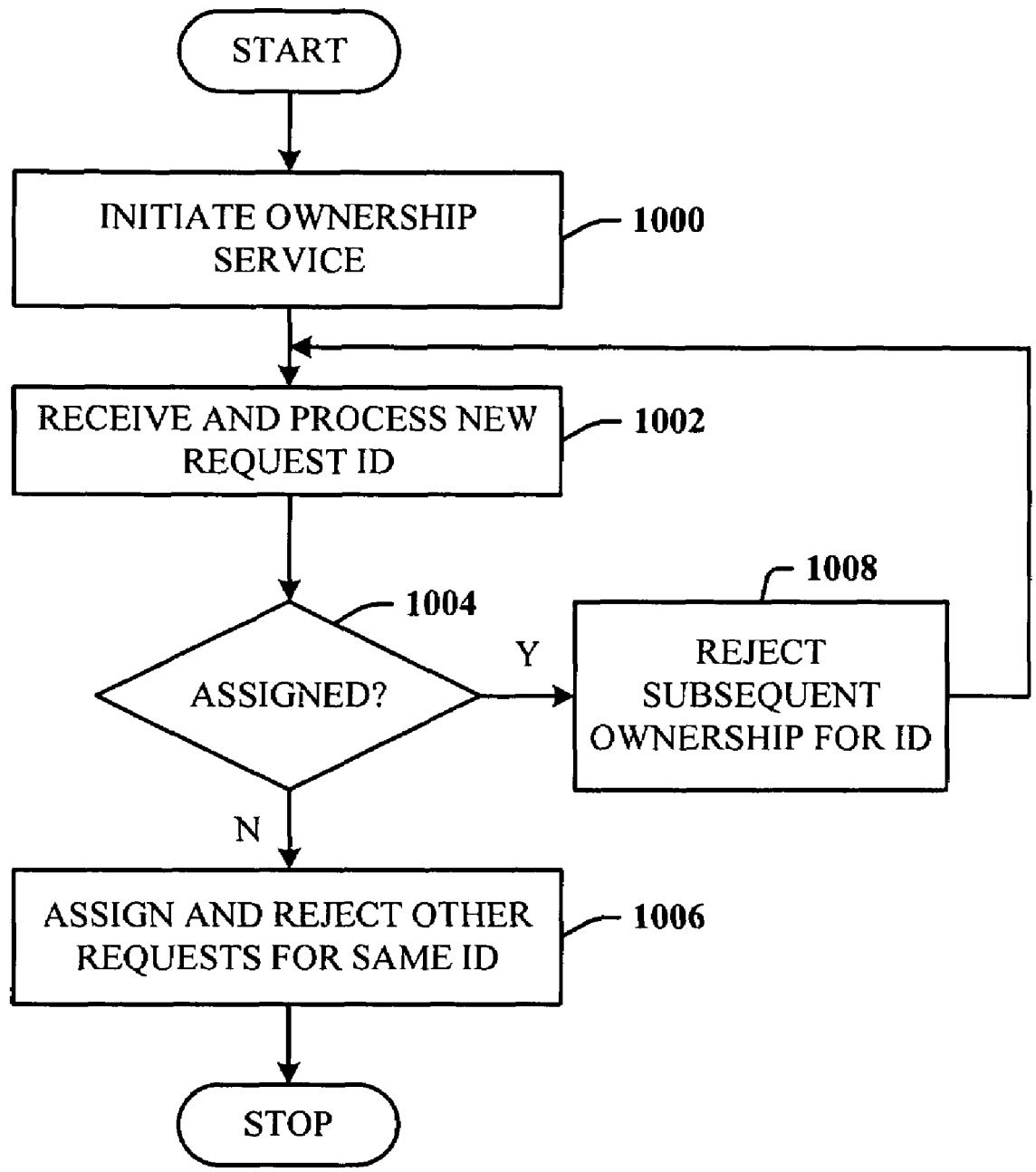
FIG. 10 illustrates a methodology of processing ownership for client synchronization.

Referring now to FIG. 10, there is illustrated a methodology of processing ownership for client synchronization. Generally, ownership can be requested for certain actions using an action ID (which typically includes a version or timestamp). Although described in the context of an update data operation, it is to be understood that this applies to other data operations as well. Additionally, data operations on the same view instance can be performed successively such that the second request operates on a different (later) version of the view instance than the first request. In other words, ownership will first be applied to the first request, and then applied to the second request. If the requests are not directed to the same view instance, then the data operations can be performed concurrently such that ownership can be assigned to the different requests at the same time.

At 1000, the ownership service is initiated. At 1002, an update data operation request to the central image (or a portion thereof) is received from a client. The request includes an action ID unique to the client and that identifies the data operation requested to be performed. At 1004, the system checks if, based on that ID, ownership can be granted. If so, flow is to 1006, where ownership is granted with a time limit to complete the data operation and subsequent requests are rejected. If, at 1004, ownership has been assigned, flow is to 1008 to reject subsequent ownership for the ID. Flow can then be back to 1002 to process the next request.

From the client side, the client can monitor the process for a timeout. In other words, if the request initiated by the client has not been processed in a predetermined amount of time, a timeout occurs, and the client user is alerted that the action requested has not been processed. The user can then manually address the cause of the timeout.

The ownership information can be tracked at the mid-tier system with success or failure information being returned. The ownership information is also roamed to the other clients to prevent redundant requests to the mid-tier and to detect if a machine that took ownership has failed to process the action in a timely manner due to shutdown, hardware failure, etc. If a timeout occurs, the user can be alerted on another machine.

Figure 11:
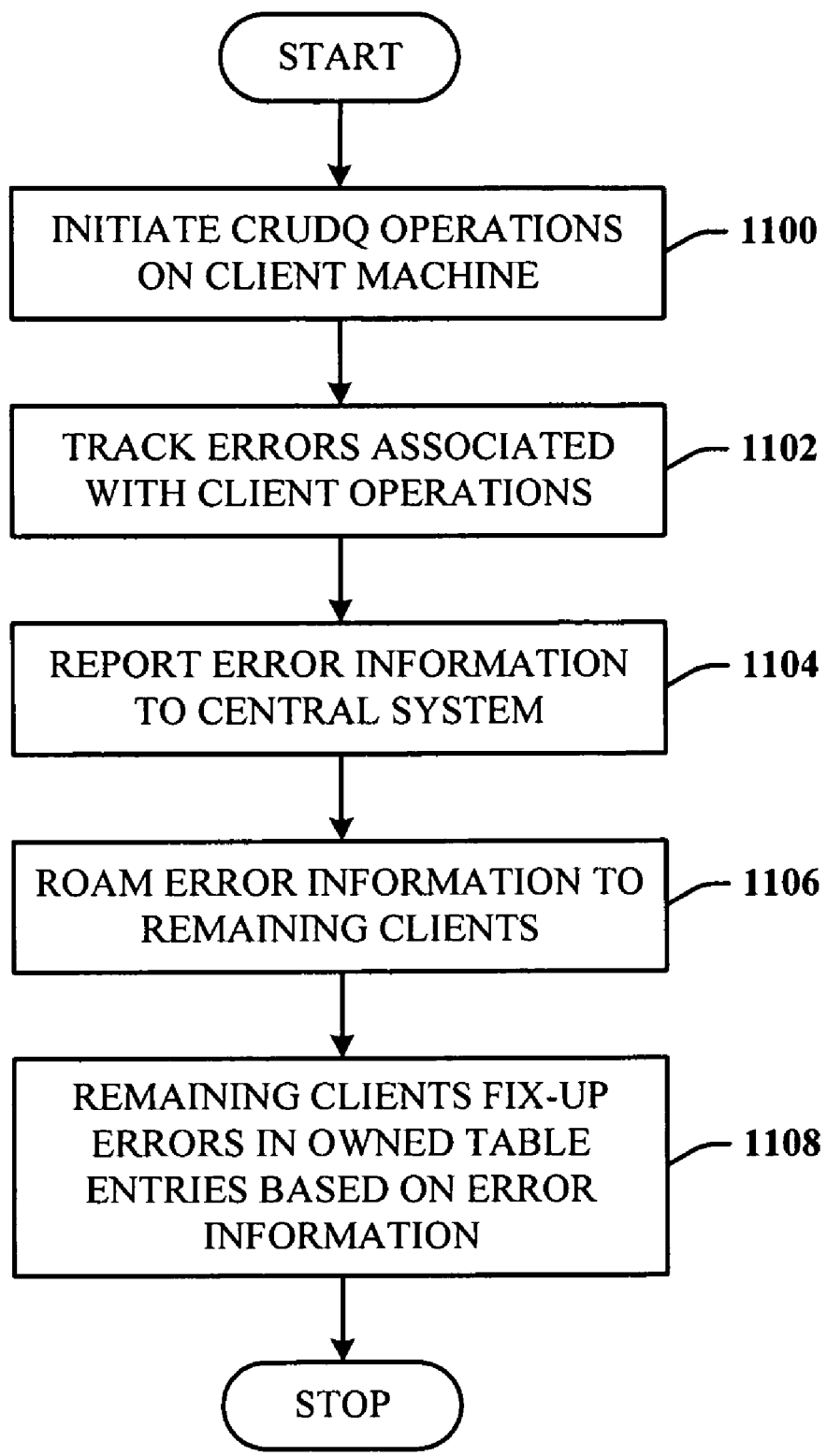
FIG. 11 illustrates a methodology of roaming business error information.

FIG. 11 illustrates a methodology of roaming business error information. At 1100, one or more CRUDQ operations are performed on a client. At 1102, errors associated with the operation are tracked on the client. At 1104, the errors are reported to the central system (e.g., mid-tier). At 1106, the error information is roamed to the remaining clients. At 1108, the remaining clients fix-up the errors that may need fixing in the client's owned table entries of the master table, in support of the single image of client information.

Figure 12:
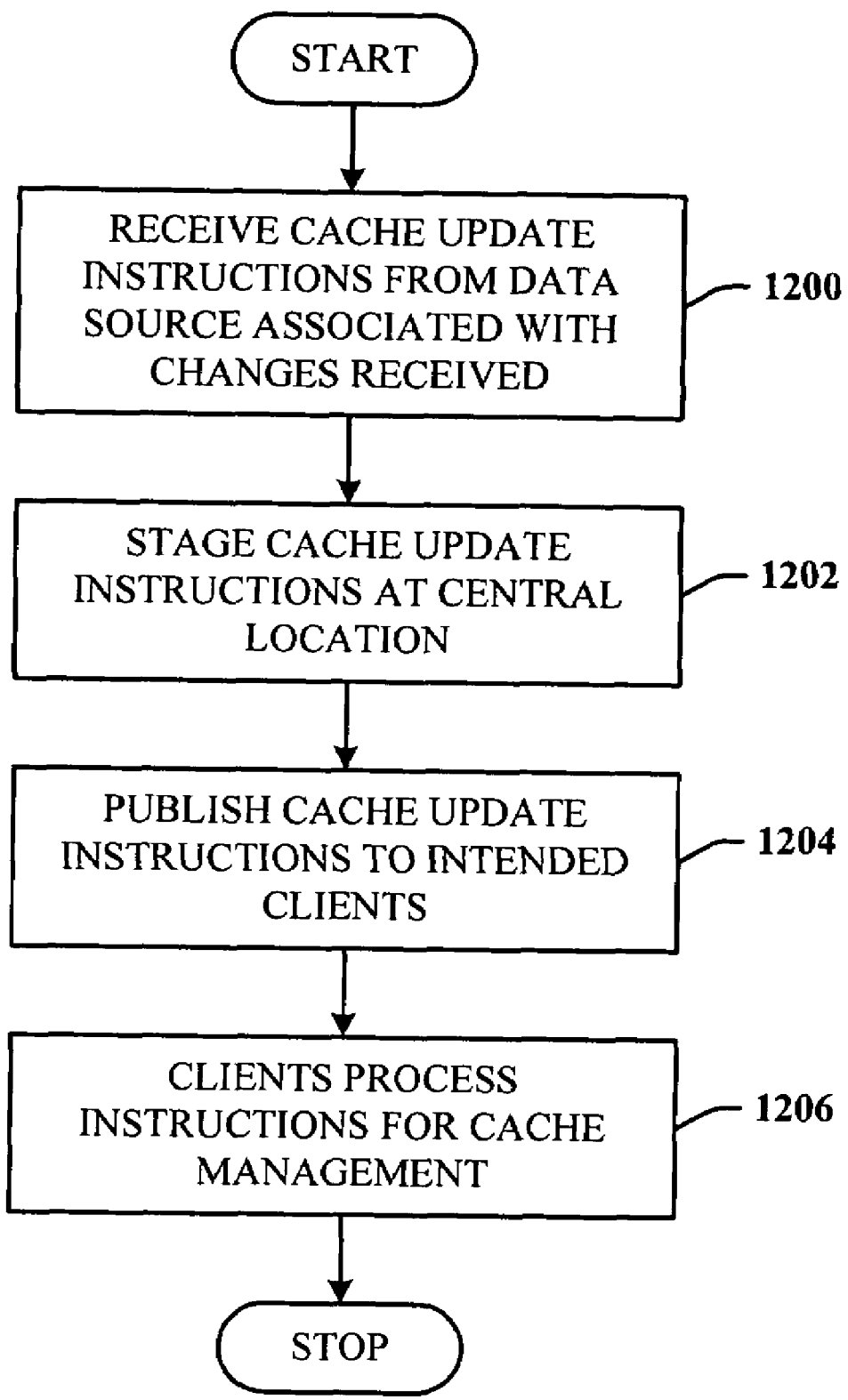
FIG. 12 illustrates a methodology of handling cache update instructions.

FIG. 12 illustrates a methodology of handling cache instructions. At 1200, a data source receives changes to data and issues cache update instructions to the central system. At 1202, the central system stages the instructions. At 1204, the central system publishes the instructions to the intended clients. At 1206, the clients process the update instructions for local cache management.

Figure 13:
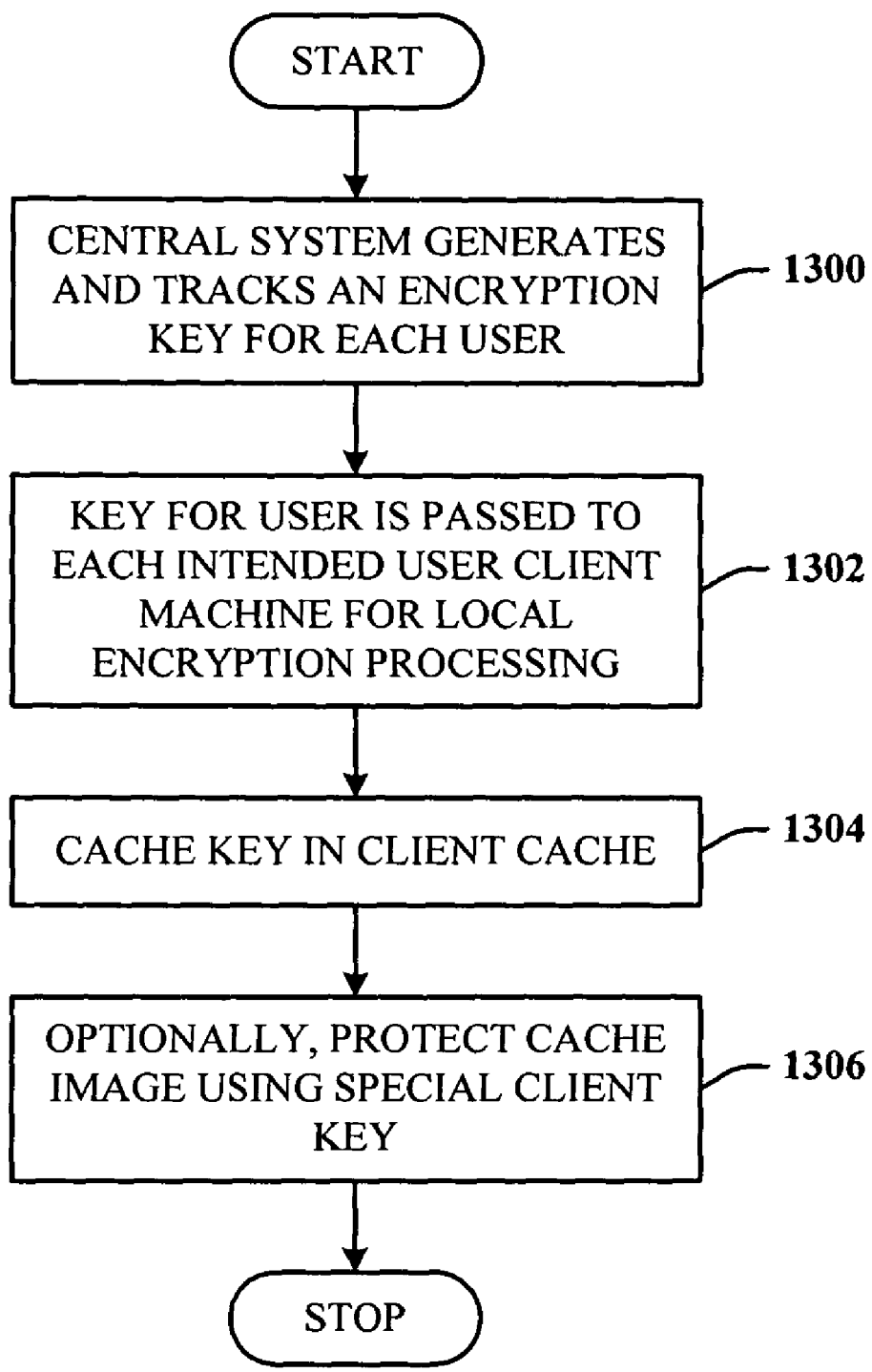
FIG. 13 illustrates a methodology of encryption management for a central client information image.

FIG. 13 illustrates a methodology of encryption management for a central client information image. At 1300, the central system generates and tracks a unique key for each user it supports. At 1302, the key for a user is passed to each intended client of the user for local encryption processing, as desired. At 1304, the key can be cached in the client cache. At 1306, optionally, the image of the client cache can be protected at the client machine using a special key.

Figure 14:
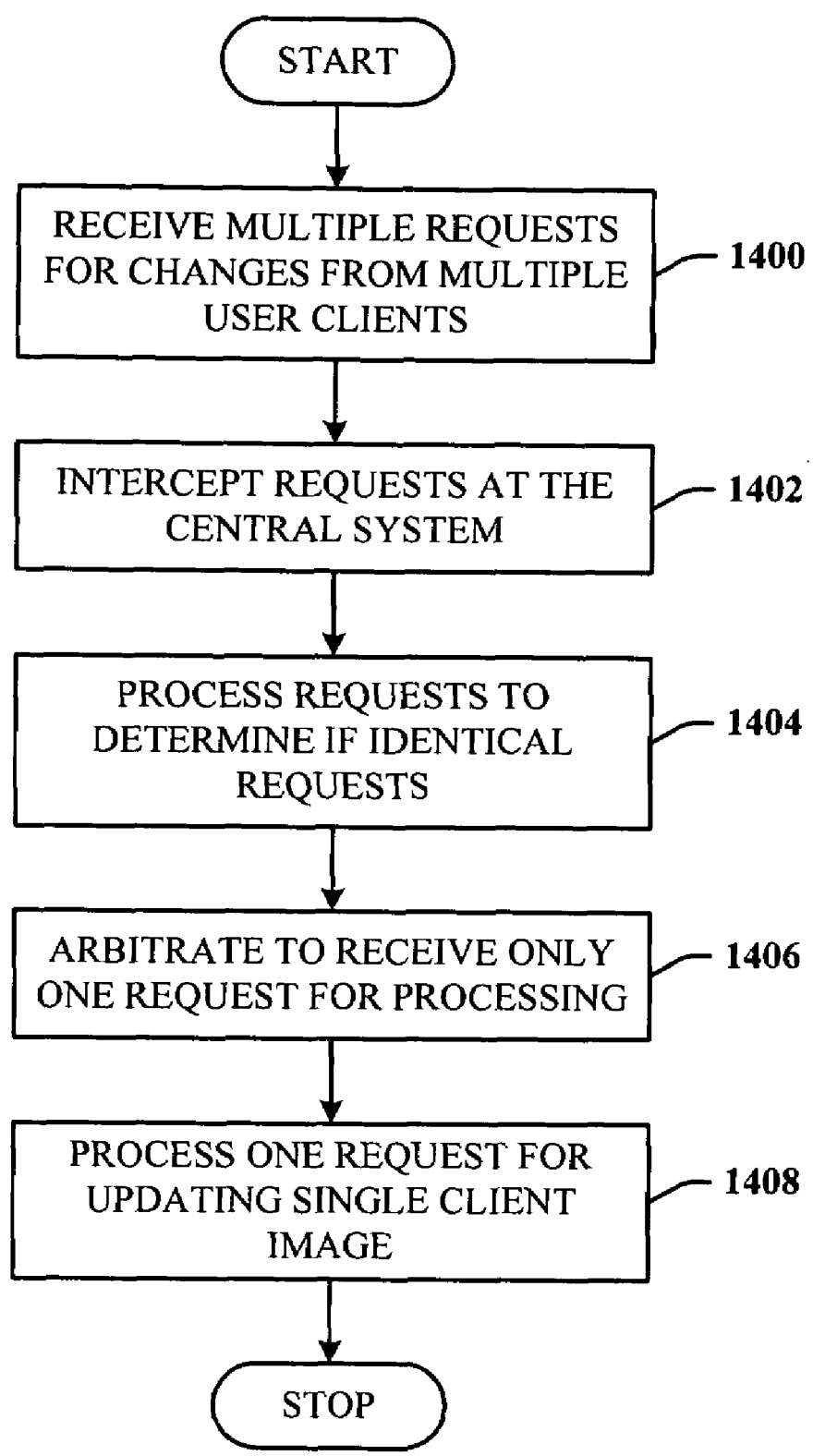
FIG. 14 illustrates a methodology of handling embedded application data for management of a single image of client information.

FIG. 14 illustrates a methodology of handling embedded application data for single centralized image of client information. At 1400, multiple requests for changes are received at the central system from multiple clients. At 1402, the requests are intercepted at the central system. At 1404, the requests are processed to determine if the requests are identical. At 1406, an ownership service arbitrates to allow only one request to be processed. At 1408, the one request is processed for updating the single client image at the central system.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 15:
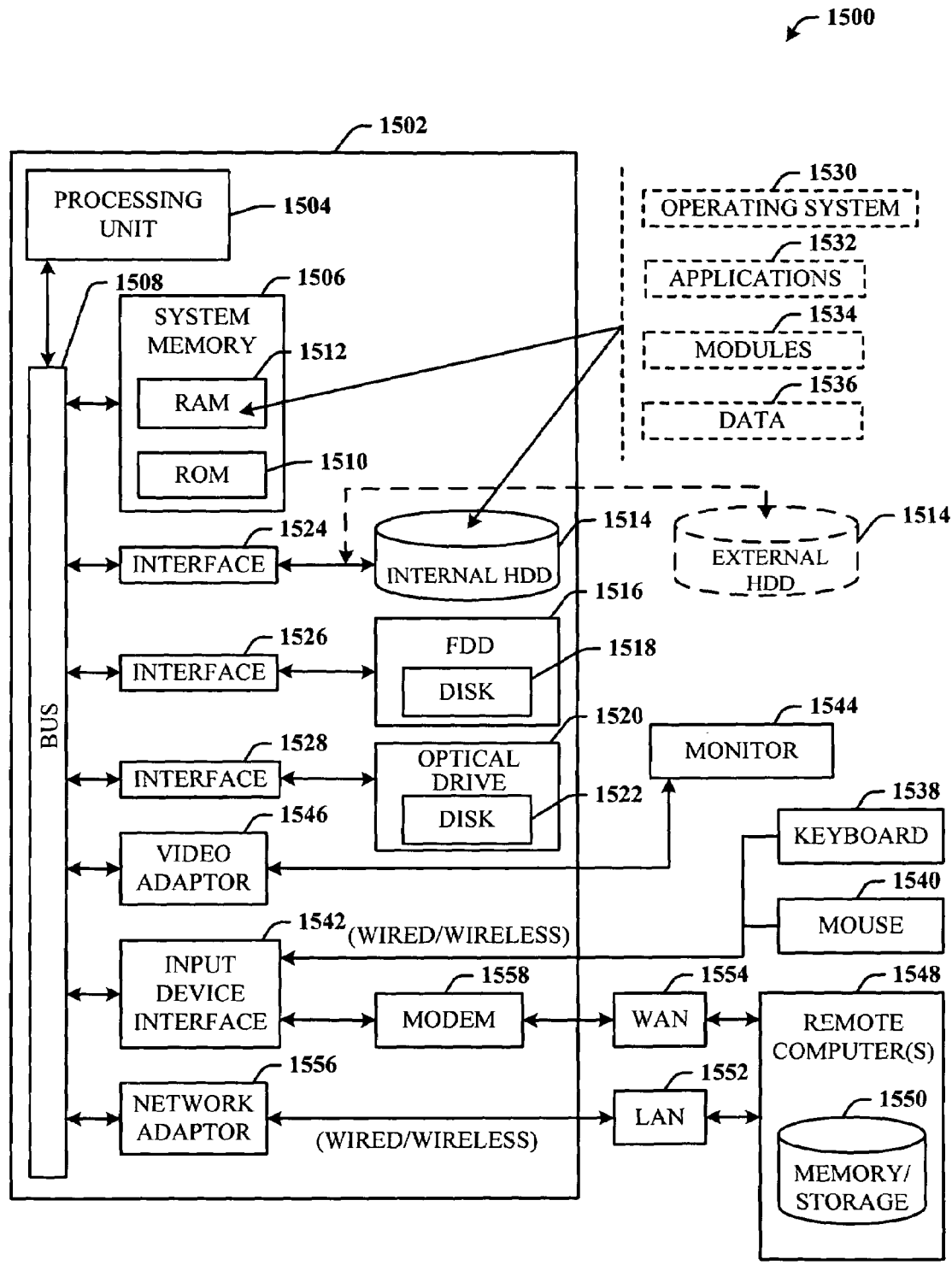
FIG. 15 illustrates a block diagram of a client computing system operable to process client information for the single virtual image of the disclosed architecture.

Referring now to FIG. 15, there is illustrated a block diagram of a client computing system 1500 operable to process client information between the single virtual image of the disclosed architecture. In order to provide additional context for various aspects thereof, FIG. 15 and the following discussion are intended to provide a brief, general description of a suitable computing system 1500 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

The computing system 1500 can host the single client image and the supporting services, as described above. The computing system 1500 can also represent a client computing device such as a desktop computer or portable computer, for example.

With reference again to FIG. 15, the exemplary computing system 1500 for implementing various aspects includes a computer 1502, the computer 1502 including a processing unit 1504, a system memory 1506 and a system bus 1508. The system bus 1508 provides an interface for system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1512, including an operating system 1530, one or more application programs 1532, other program modules 1534 and program data 1536. When a client machine, these modules can include the client tables, client programs for interacting with the services at the central location, and so on. When the centrally located server, these modules can include the services in support of the single client image, the image itself, and master table, for example. All or portions of the operating system, applications, modules, and/or data can also be cached in the RAM 1512. It is to be appreciated that the innovation can be implemented with various commercially available operating systems or combinations of operating systems.

A user can enter commands and information into the computer 1502 through one or more wired/wireless input devices, for example, a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 16:
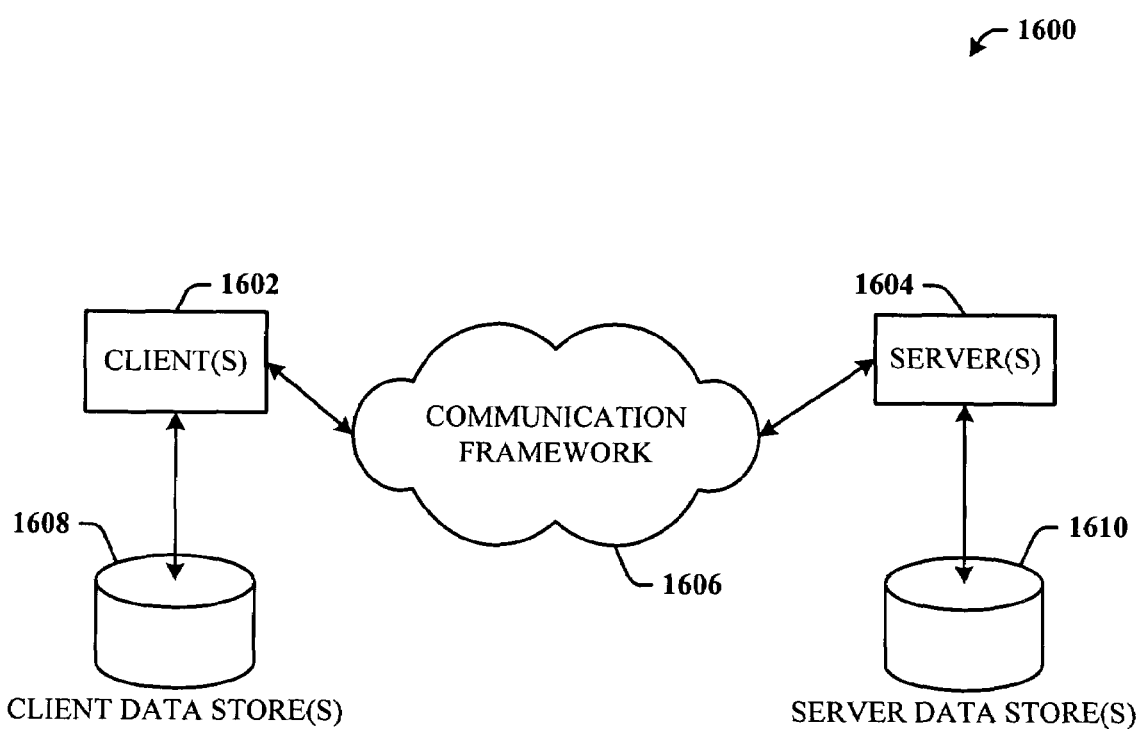
FIG. 16 illustrates a schematic block diagram of an exemplary computing environment for hosting the single virtual client image and providing services for support of maintaining the image.

Referring now to FIG. 16, there is illustrated a schematic block diagram of an exemplary computing environment 1600 for hosting the single virtual client image and providing services for the support of maintaining the image. The system 1600 includes one or more client(s) 1602, which can be hardware and/or software (e.g., threads, processes, computing devices). The clients 1602 can be multiple computing devices of a single user for which the user desired to be equivalent by having the same set of information stored thereon. The client(s) 1602 can house cookie(s) and/or associated contextual information by employing the subject innovation, for example.

The system 1600 also includes one or more server(s) 1604, which can also be hardware and/or software (e.g., threads, processes, computing devices). One of the servers can be a mid-tier system that stores the single client image of client information and provides the services in support of maintaining the image. Another server can be a back-end or LOB system which a user accesses via the multiple user computing devices. The servers 1604 can house threads to perform transformations by employing the architecture, for example. One possible communication between a client 1602 and a server 1604 can be in the form of a data packet adapted to be transmitted between two or more computer processes. The data packet may include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client datastore(s) 1608 that can be employed to store information local to the client(s) 1602 (e.g., cookie(s) and/or associated contextual information). Similarly, the server(s) 1604 are operatively connected to one or more server datastore(s) 1610 that can be employed to store information local to the servers 1604.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates client management, the system comprising a processing unit executing computer-executable program components stored in memory comprising:
    a services component of a remote location for providing coordination services for coordination of client information across multiple client devices of a user; and
    a storage component of the remote location for maintaining a single virtual client image of the client information at the remote location for access by the multiple client devices of the user, wherein:
    the single virtual client image of the client information maintained by the storage component represents client information aggregated from the multiple client devices of the user and is updated to reflect changing client information across the multiple client devices of the user,
    data operations performed by offline client devices of the user that change client information are associated with temporary correlation identifications (CIDs) generated by the offline client devices of the user,
    each temporary CID is unique to one client device of the user and to one data entity that underwent a data operation when the one client device of the user was offline,
    the temporary CIDs generated by an offline client device of the user are uploaded to the remote location when the offline client device of the user goes back online and are used to update the single virtual client image of the client information,
    the remote location provides access to stored data entities of a data source uploaded by the multiple client devices of the user when online and changed by the multiple client devices of the user when offline,
    the remote location provides mapping between the temporary CIDs associated with the data operations performed by the offline client devices of the user and entity IDs (EIDs) associated with the stored data entities of the data source, and
    the changing client information is propagated to other online client devices of the user via synchronization of the other online client devices of the user with the single virtual client image of the client information.

2. The system of claim 1, wherein the remote location is a mid-tier system at which the storage component maintains the single virtual client image of the client information and from which the services component provides the services.

3. The system of claim 1, wherein the services component includes a notification service for publishing cache update instructions to the multiple client devices of the user, the instructions received from a data source and for broadcast to intended client devices of the user.

4. The system of claim 1, wherein the services component includes an ownership service for selection of one of the multiple client devices of the user to perform actions.

5. The system of claim 1, wherein the services component includes an encryption service for tracking an encryption key provided to the multiple client devices of the user for encrypting client data.

6. The system of claim 1, wherein the services component includes a roaming service for sharing the temporary CIDs generated by the offline client devices of the user among the multiple client devices of the user.

7. The system of claim 1, wherein:
    the remote location comprises an always-on central network location that provides access to the single virtual client image of the client information.

8. The system of claim 1, wherein the single virtual client image of the client information maintained by the storage component includes client information associated with data operations related to create, read, update, delete, or query operations performed by a client device of the user on a data source.

9. The system of claim 8, wherein a subset of the single virtual client image of the client information propagated to the multiple client devices of the user during synchronization reflects results of the data operations performed on the data source.

10. The system of claim 1, wherein the services component includes an ownership service that arbitrates processing of identical requests from multiple client devices of the user based on an application that facilitates embedded data.

11. A computer-implemented method of managing client information, comprising:
    receiving client information from multiple computing devices of a user;
    aggregating the client information into a single virtual client image of the client information at a mid-tier network location;
    receiving temporary correlation identifications (CIDs) generated by the multiple computing devices of the user, wherein:

the temporary CIDs are associated with data operations performed by the multiple computing devices of the user when offline, and each temporary CID is unique to one computing device of the user and to one data entity that underwent a data operation when the one computing device of the user was offline;

managing changes to the single virtual client image of client information using the temporary CIDs;

providing access to stored data entities of a data source uploaded by the multiple computing devices of the user when online and changed by the multiple computing devices of the user when offline;

mapping between the temporary CIDs associated with the data operations performed by the offline computing devices of the user and entity IDs (EIDs) associated with the stored entities of the data source; and publishing the changes to the multiple computing devices of the user via synchronization of online computing devices of the user with the single virtual client image of the client information.

12. The method of claim 11, wherein:
the mid-tier network location comprises an always-on central network location providing access to the single virtual client image of the client information.

13. The method of claim 12, further comprising maintaining a master identity table at the mid-tier network location that maps the temporary CIDs to the EIDs.

14. The method of claim 11, further comprising dynamically selecting one of the multiple computing devices of the user to perform a synchronization process with the single virtual client image of the client information.

15. The method of claim 11, further comprising generating an encryption key at the mid-tier network location that encrypts client information of the multiple computing devices of the user.

16. The method of claim 11, further comprising:
staging cache update instructions received from a data source at the mid-tier network location; and
publishing the cache update instructions from the mid-tier network location to the multiple computing devices of the user.

17. The method of claim 11, further comprising roaming error information to the multiple computing devices of the user via the single virtual client image of the client information.

18. The method of claim 13, wherein each of the multiple computing devices of the user is restricted to updating corresponding entries of the master identity table.

19. The method of claim 11, further comprising:
timing out an update process of one of the multiple computing devices of the user; and
assigning ownership to another of the multiple computing devices of the user for synchronization with the single virtual client image of the client information.

20. A computer-readable storage medium that does not consist of a signal, the computer-readable storage medium having computer-executable instructions stored thereon that, when executed, cause a computer system to perform a computer-implemented method, comprising:
receiving client information from multiple clients of a user;
storing the client information as a single virtual client image of the client information at an always-on central network location;
receiving temporary correlation identifications (CIDs) generated by the multiple clients of the user, wherein:
the temporary CIDs are associated with data operations performed by the multiple clients of the user when offline, and
each temporary CID is unique to one client of the user and to one data entity that underwent a data operation when the one client of the user was offline;
processing changes to the single virtual client image of the client information based on the temporary CIDs;
providing access to stored data entities of a data source uploaded by the multiple clients of the user when online and changed by the multiple clients of the user when offline;
mapping between the temporary CIDs associated with the data operations performed by the offline clients of the user and entity IDs (EIDs) associated with the stored entities of the data source; and
publishing updated client information from the central network location to the multiple clients of the user via synchronization of online clients of the user with the single virtual client image of the client information.

* * * * *